Figure 1:
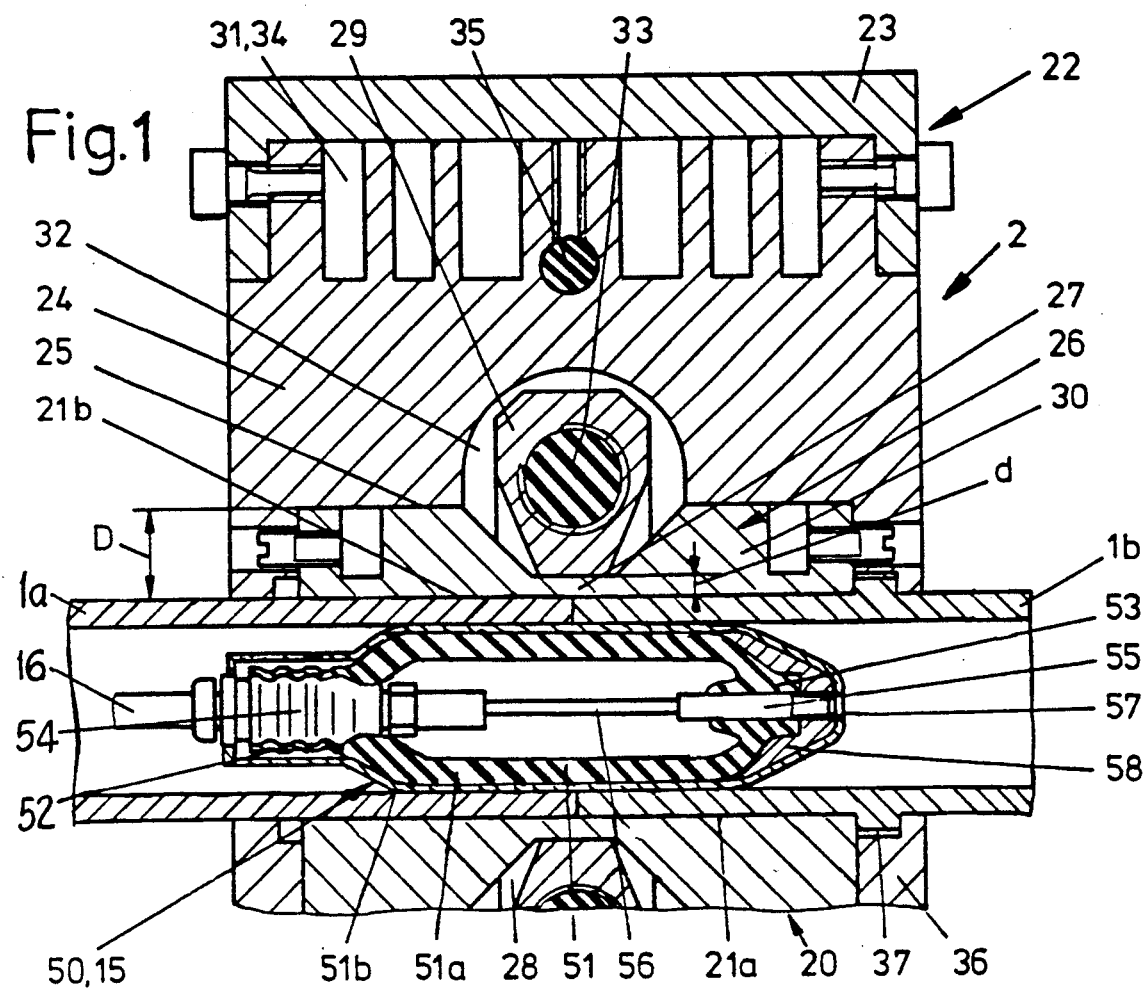

United States Patent [19]

Hilpert

[11] Patent Number: 5,037,500
[45] Date of Patent: Aug. 6, 1991

[54] METHOD AND APPARATUS FOR JOINING TUBULAR PLASTIC PARTS BY WELDING

[75] Inventor: Bruno Hilpert, Diessenhofen, Switzerland

[73] Assignee: Georg Fischer AG, Schaffhausen, Switzerland

[21] Appl. No.: 393,983

[22] Filed: Aug. 15, 1989

[30] Foreign Application Priority Data

Aug. 16, 1988 [CH] Switzerland .................. 03068/88

[51] Int. Cl.⁵ .......................................... B29C 65/30
[52] U.S. Cl. .................................. 156/503; 156/158;
156/304.2; 156/304.6; 156/502; 156/583.4;
219/535
[58] Field of Search .............. 156/158, 304.2, 304.6,
156/502, 503, 583.4; 219/535

[56] References Cited

U.S. PATENT DOCUMENTS

| 2,763,910 | 9/1956 | Braatelien | 156/304.2 |
| 3,022,209 | 2/1962 | Campbell | 156/158 |
| 4,792,374 | 12/1988 | Rianda | 156/503 |
| 4,801,349 | 1/1989 | Dommer et al. | 156/304.2 |

Primary Examiner—Michael G. Wityshyn
Attorney, Agent, or Firm—Toren, McGeady & Associates

[57] ABSTRACT

A heating arrangement (2) embracing tubular parts (1a, 1b) of plastic material which have to be joined by welding, comprises electrically heatable jaws (26).

A bladder (50) expandable by compressed air is arranged inside the tubular parts (1a, b), which includes a centrally arranged tensile part (56) such as, for instance, cable for the purpose of limiting the length. The air pressure in the bladder is higher than the pressure generated by the material when melting, this for the purpose of producing an adequate welding pressure.

3 Claims, 2 Drawing Sheets

METHOD AND APPARATUS FOR JOINING TUBULAR PLASTIC PARTS BY WELDING

The invention is directed to a method for joining of tubular plastic parts by welding, in which method, two parts with their end faces lying adjacent to each other are retained by a heating device embracing these parts along their circumferential area, by means of the heating device the ends are heated in the butt region until the material is melted and subsequently cooled, and a pressure is exerted upon the internal combustion area by an expandable support device, as well as apparatus required for performing this method.

A method of the previously mentioned type is known where, during or after the heating of the axially abutting tubular parts, a vacuum is produced. This is intended to prevent the melted material from dropping inwards, thus avoiding the formation of an inside bead at the welded connection. It has, however, been seen that it is impossible to produce with this method or with this apparatus welded connections which are smooth at the inner circumferential surface and satisfactory as far as their strength is concerned.

It is furthermore known (DE-PS 2830722) to arrange an elastic insert for reducing the inner welding beads at the inside circumferential surface of the tubular parts, with the insert resting at said inner surface.

However, for the welding process the front end faces of the tubular parts are heated by pressing them against heating elements and subsequently they are thrust against each other, whereby a welding pressure is produced. A welding connection completely free of beads is not achievable with this method, and apart from that the inside space of the parts which are heated at their abutting ends can be contaminated by dirt so that the required cleanliness for connections of pipeline systems intended for conveyance of media with a high degree of purity is not present.

It is a task of the present invention to create a method and an apparatus of the previously mentioned type, with the help of which an adequate welding pressure can be produced without pressing the parts to be joined by welding axially against each other, so that a bead-free and solid connection of the tubular plastic parts can be produced. In particular, welded connections in pipeline systems which are intended for conveyance of media having a high degree of purity are to be producible by the method and the apparatus.

This task is solved in the invention by having the pressure exerted upon the inner circumferential area of the tubular parts correspond to an optimum welding pressure when the ends of the tubular parts are axially pressed against each other, this pressure causing a compacting of the material in the melt region. The apparatus for carrying out this method includes heating a device having heating jaws which can be folded out and which embraces the tubular parts, as well as a support device arranged inside the tubular parts, which is an elastic bladder expandable by a pressure medium and which comprises a tensile part in its inside limiting the longitudinal extension, each heating jaw is solidly connected to its central region with a heating part consisting of copper and comprising an electrical heating cartridge, and exhibits in this central region a thinner wall thickness with respect to the regions adjacent on both sides, this for a good and rapid heat transfer to the tubular parts which are to be joined by welding.

Particularly expedient embodiments of the invention are characterized in the dependent claims.

For the welding connection of tubular ends by heating their end faces and subsequently pressing them together axially, an optimum joining pressure or welding pressure is known for a good welded connection involving differing materials and dimensions; wherein in the invention respectively the same pressure intensity is used for the welding method cited in the preamble, in order to exert pressure on the inside circumferential surface of the tubular parts in the welding region by means of the expandable support device, so that a compacting of the material in the welding region is achieved for a good welded connection which, however, is also free of beads.

Examples of the invention are depicted in the enclosed drawings and are subsequently described.

It is shown on:

FIG. 1: a partial section of an apparatus for welding two tubular parts together, this at the start of the welding process.

Figure 2:
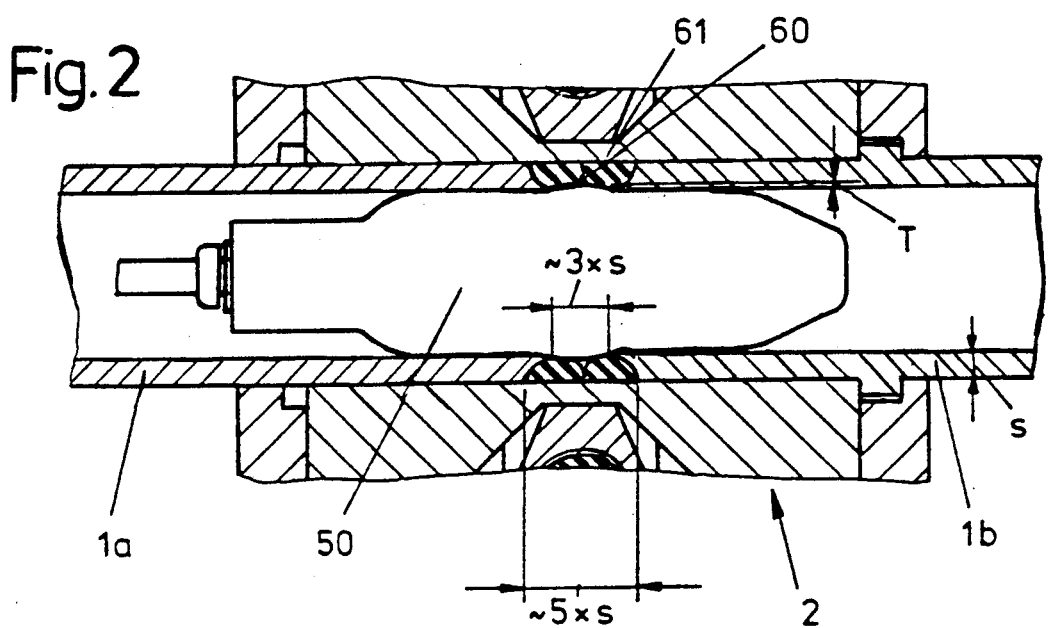

FIG. 2: a simplified illustration of FIG. 1 during or at the end of the welding process.

Figure 3:
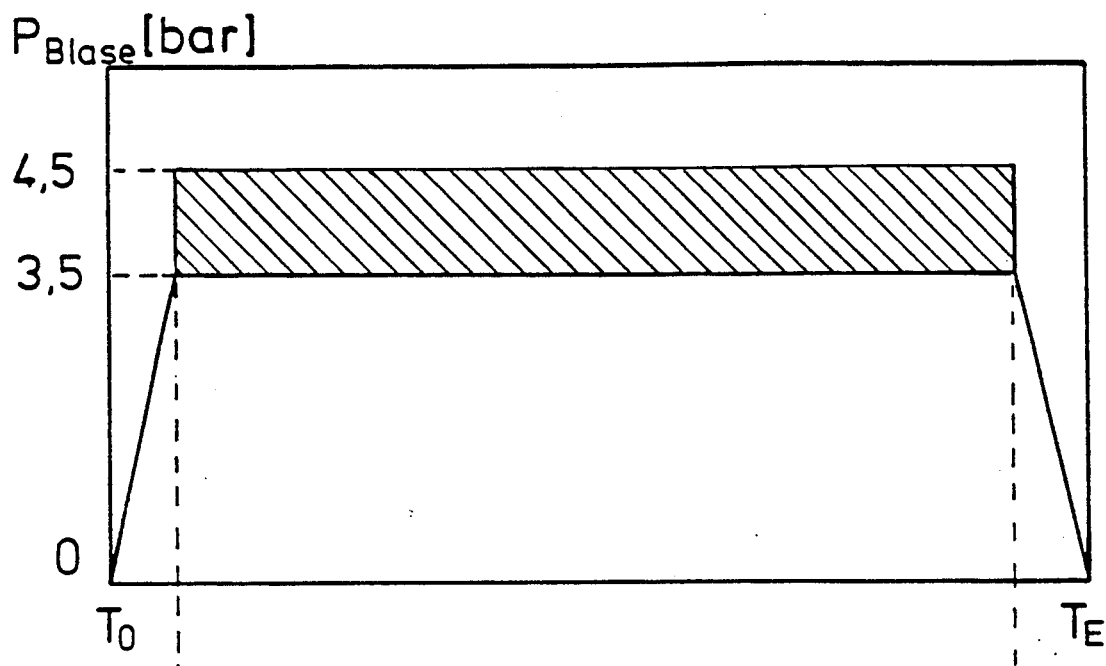

FIG. 3: a time-bladder pressure diagram of the welding process.

Figure 4:
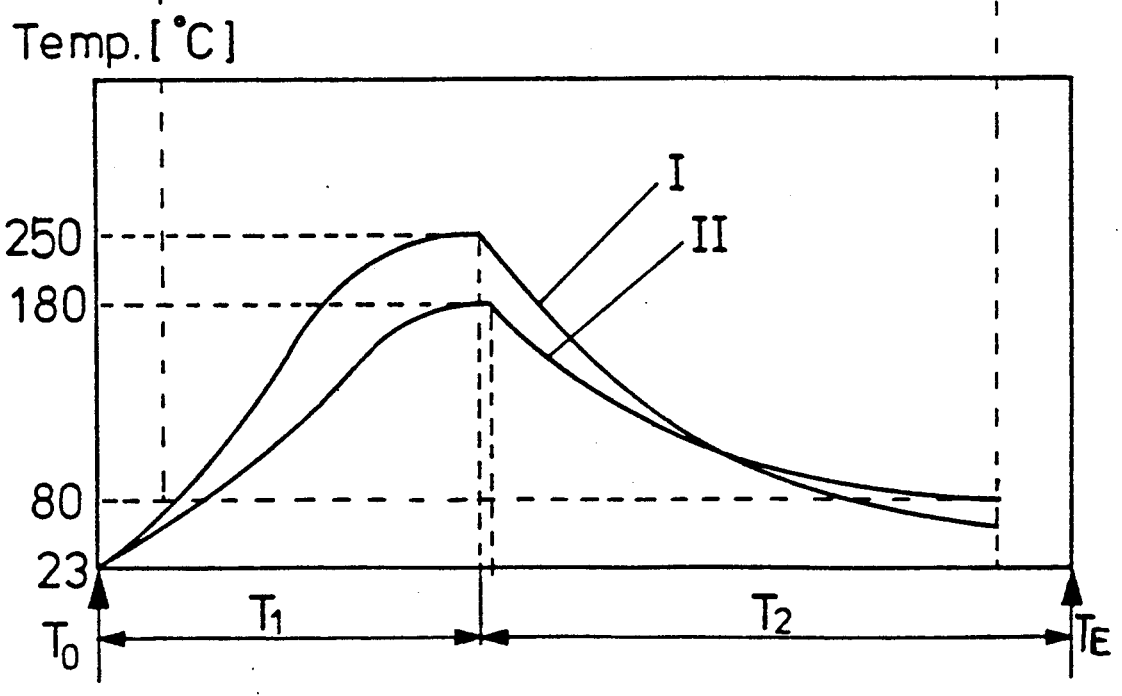

FIG. 4: A time-temperature diagram of the welding process.

FIG. 1 shows a partial section of an apparatus for welding of tubular parts 1a, 1b with a heating device 2 and a support device 15. The heating device 2 consists of a bottom portion 20 with a receptacle 21a semicircular in cross-section for the tubular parts 1a and 1b to be welded together and a top portion 22 with a corresponding receptacle 21b. The upper portion 22 is connected with the bottom portion 20 by a rotary joint, so that it can be folded out and they can be clamped together by means of a clamping device. A retention part 24 is fastened in a shell-shaped housing portion 23 respectively in the bottom- and top portion 20 or 22 of the heating device 2, in which retention part a heated jaw 26 is respectively arranged to be centered in a turned-out hollow bore.

The heating jaw 26 has a thin wall thickness d in the middle region 27 towards the receptacle 21 produced by a recess 28 for good transfer of heat from a heating cartridge 33 to the welding point.

A heating part 29 preferably made of copper is arranged in the recess 28 and is solidly connected by soldering with the heating jaw 26 preferably consisting of stainless steel. The heating cartridge 33 and a heat sensor 35 are inserted into the heating part 29. The temperature gradient in the central portion 27, the so-called heating zone, can be established by the cross-sectional shape of the recess 28 wherein the regions 30 on both sides of it, which constitute the tempering zones, are heated less because of the greater wall thickness D. The transition from the wall thickness d to the wall section thickness D of the heating jaw 26 runs preferably in an oblique manner, wherein the lengths of the individual portions depend upon the length of the melting region of the tubular parts 1a, 1b. Recesses 31 are arranged at the outer peripheral surface of the retaining part 24, which form a channel 34 for the passage of the cooling air produced by a fan.

A recess 32 is arranged centrally at the inner peripheral surface of the retaining part 24, through which cooling air is also passed for rapid cooling of the heating part 29 and with it of the welded connection.

The side walls 36 of the retaining parts 24 comprise a turned-out recess 37 at the inner peripheral surface which in shape and size correspond to the beads arranged at the tubular parts 1b designed as fittings which are to be welded together. Thereby the fittings are retained in axial direction in their correct position.

The support arrangement 15 is constructed as an elastic bladder 50 which can be widened or blown up, wherein the bladder body 51 comprises an inner elastic jacket 51a for receiving the pressure medium and an outer jacket 51b.

The outer jacket 51b is fabricated from a heat resistent elastomeric material as, for instance, silicone and has a smooth surface. An air line 16 connected to one end 52 of the bladder 50 is connected with a compressed air generator as for instance a compressor. A pressure switch arranged in the air line 16 is in effective connection through a pressure adjustment instrument with a program control and assures that the required pressure which has been set up in the bladder is maintained.

Retaining parts 54 and 55 are arranged at the ends 52, 53 of the inner jacket 51a which ends are designed to be hub-shaped, between which ends a tension part 56 as, for instance, a flexible rod or a cable 56 is fastened. One retention part 55 is adjustable in longitudinal direction by means of a thread 57 and a nut 58.

The tensile part 56 limits the longitudinal extension of the bladder 50 when pressure is built up within the bladder, so that an increase in diameter and with this an adjustable pressure against the inner walls of the tubular parts 1a, 1b is assured.

The external heat resistent thin jacket 51b covers all metallic parts as, for instance, the nut 58 and the retaining parts 54 and 55. This assures that no metallic parts come into contact with the inner wall of the tubular parts 1a, 1b which is particularly important in piping systems used in clean room technology.

The pressure against the inside walls of the tubular parts 1a, 1b in the region of the butt joint or the welded connection should in each case correspond to a welding pressure as it is used in the welding process with axial joining of the parts. Herein this pressure is higher, however at least as high as the pressure generated by the extension of the plastic material when it is melting. The welding pressure generated thereby assures a satisfactory welded connection. Depending upon the material, diameter and wall thickness of the tubular parts to be joined by welding, an air pressure in the bladder of 2 to 6 bar, preferably 3.5 to 4.5 bar, is required herein.

After the axially adjacent tubular parts 1a, 1b have been clamped and the unpressurized and flexible bladder 50 has been introduced into the region of the butt joint into the inner space of the tubular parts 1a, 1b, a compressed air supply to the bladder is switched on and simultaneously with this or after the adjusted pressure in the bladder has been attained, the heat in the heating jaws 26 is switched on. The material in the region of the butt joint, which has been melted by the high temperatures of approximately 180°-250° C., expands somewhat and fills possibly existing cavities in the material which, for instance, were produced by parts which are not in perfect butt contact with each other. In addition the melt is pressed outwards by the pressure in the bladder 50, where it is radially retained by the heating jaws 26 and axially by the tubular parts 1a, 1b which have not melted. The melted material is compacted wherein, as is discernible in FIG. 2, depending upon the size of the existing cavities at the inside diameter, a depression 60 with a depth T of at a maximum several tenths of mm. can be generated by the pressure in the bladder. A solid welding connection is produced by the material compacting in the welding region 61. In order to achieve a good joint by welding, the welding region 61 or the melted material should, proceeding from the butt joint in longitudinal direction, have at the internal diameter respectively a length of at least 1.5 times the tube wall thickness s (a total of three times s) and, at the external diameter, at least a length of 2.5 times the tube wall thickness s (a total of 5 times s). (See FIG. 2).

After a specific adjustable heat energy has been supplied to the tubular parts, which depends upon the material and the dimensions, the heating is switched off and the air cooling is switched on. When the tubular parts have cooled to 80°-90° C., wherein the welded connection has been consolidated, the pressure in the bladder is relieved and the parts joined by welding can be removed from the heating aggregate. The bladder can also be pulled out of the heating aggregate.

FIGS. 3 and 4 show, respectively, diagrams for the bladder pressure and the material temperature as a function of the welding period, when welding tubes consisting of polyvinylidenefluoride having the usual standard diameter of 16 to 63 mm Herein, the air pressure in the bladder is maintained constant within a range between 3.5 and 4.5 bar as is discernible in FIG. 3.

In FIG. 4, the temperature gradient at the external wall is discernible from curve I and the temperature gradient at the inner wall is discernible from curve II, both being applicable to the tubular parts 1a, 1b in the welding region. $T_0$ is the start and $T_e$ is the termination of the welding period, wherein this period amounts to approximately 7 to 12 minutes.

$T_1$ shows the heating period and $T_2$ the cooling period.

With other materials, as for instance polyethylene, polypropylene or polychlortriflouroethylene, and with other dimensions, these values can differ somewhat from those shown wherein the chronological progression is essentially the same.

The method of the invention and the apparatus required for this method assure a perfectly solid welded connection free of beads without having to exert an axial pressure on the parts to be joined by welding, thus avoiding changes in length within the pipeline system.

Contaminations inside the tubes during the welding process are also prevented to a considerable degree with this method.

I claim:

1. An apparatus for welding together ends of plastic tubular parts, comprising:
   heating jaws which are outwardly foldable and embrace the tubular parts;
   support means arranged inside the tubular parts, which support means includes an elastic bladder expandable by a pressure medium, said bladder including an inner elastic jacket which receives the pressure medium and an outer elastic heat-resistance jacket with a smooth surface, said support means further including a tensile part arranged inside said bladder so as to limit a longitudinal extension of said bladder; and
   heating means including a copper heating part and an electrical heating cartridge, each of said heating jaws being firmly connected in a central region to said heating part, the central region having a wall thickness thinner than that of regions of heating jaws on either side of the central region so as to provide good and rapid heat transfer to the tubular parts.

2. An apparatus according to claim 1, wherein said tensile part has an effective length which is adjustable with respect to said bladder by nut means.

3. An apparatus according to claim 1, and further comprising a compressed air generator, a hose connecting said bladder and said compressed air generator, and an adjustable pressure switch arranged in said hose, which pressure switch is in connection with a programmed control means.

* * * * *